Sept. 7, 1965
F. H. WRIGHT
3,205,347
ROOT MEAN SQUARE CONVERTER
Filed Dec. 29, 1961
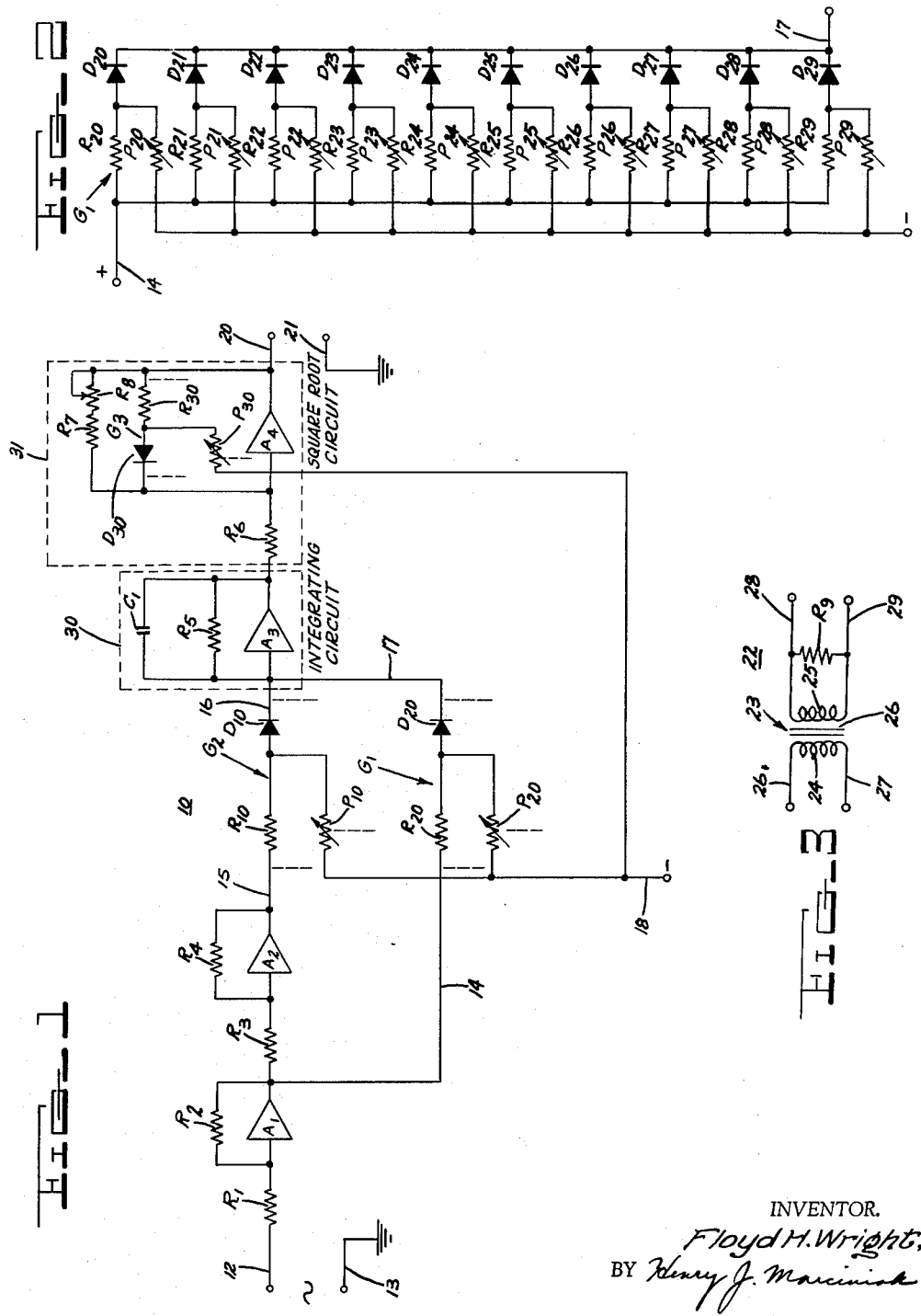
INVENTOR.
Floyd H. Wright,
BY Henry J. Marciniak
Attorney.

United States Patent Office 3,205,347
Patented Sept. 7, 1965

3,205,347
ROOT MEAN SQUARE CONVERTER
Floyd H. Wright, Fort Wayne, Ind., assignor to General
Electric Company, a corporation of New York
Filed Dec. 29, 1961, Ser. No. 163,301
1 Claim. (Cl. 235—193.5)

This invention relates to root mean square converters and particularly to such converters wherein an alternating voltage is converted to a D.C. voltage signal proportional to the root mean square value of the alternating voltage.

In many applications of automatic control systems, analogue computers and decision making equipment, it is desirable that a D.C. voltage signal proportional to the root mean square value of the alternating voltage be provided. Such a root mean square converter, when used in conjunction with a current transformer may be employed as an electronic ammeter.

It will be appreciated that root mean square values of an alternating current or voltage are generally used in practice rather than the instantaneous values as a measure of the current or the voltage (the needle deflection of the meters used to make measurements is a function of the root mean square value). By definition, the root mean square or effective value of an alternating current or voltage is equal to the square root of the mean values of the squares of the instantaneous values of the alternating quantity measured over a complete period.

Conventional ammeters, such as ammeters of the moving iron type, are root mean square converters, as the term is generally used herein. Such conventional ammeters convert an alternating current to a relative movement of a movable piece of magnetic material that is proportional to the root mean square of the alternating current measured. The operation of a moving iron type of ammeter depends upon the reaction resulting from current flow in one or more fixed coils acting upon one or more pieces of magnetic material exposed in the field of the coil. Current flow in the fixed coils causes a relative movement between the fixed and movable pieces of magnetic material. Thus, relative movement between the pieces of magnetic material provides a scale for the root mean square value of the current flowing through the coil.

Root mean square converters of the moving iron type, although capable of accurately measuring the root mean square values of current, do not provide an electrical signal that is proportional to the effective values of the alternating current. Consequently, there has been a need for a root mean square converter capable of converting an alternating signal to a D.C. signal that is proportional to the root mean square or effective values. Further, the root mean square converter should have a rapid time response and provide a D.C. output signal that should be accurately proportional to the alternating voltage applied at its input.

Accordingly, it is a general object of the invention to provide an improved root mean square converter capable of providing a D.C. voltage signal that is accurately proportional to the root mean square value of the signal applied at its input.

A more specific object of the invention is to provide an improved root mean square converter supplying a D.C. voltage signal at its output that is proportional to the root mean square value of the alternating signal applied at its input over a wide range of frequencies.

It is still another object of the invention to provide an improved electronic ammeter.

A further object of the invention is to provide an improved root mean square converter that has a rapid response and that draws a negligible amount of power from the power supply monitored.

These and other objects and advantages of the invention are achieved in one form of my invention wherein an electrical apparatus is provided for producing an electrical signal proportional to the root mean square value of an alternating signal applied at the input thereof. The apparatus is comprised of a squaring circuit means for converting the alternating signal to unidirectional signals proportional to square of the instantaneous positive and negative values of the alternating signal, an integrating circuit having its input coupled to the output of the square circuit means and a square root circuit means having its input coupled to the output of said intregrating circuit. The square root circuit means converts the signal at the output of the integrating circuit to a signal proportional to the square root of the mean value of the squares of the instantaneous positive and negative values of the alternating signal. Thus, the magnitude of the signal at the output of the square root circuit means is proportional to the root mean square value of the alternating signal.

In another aspect of the invention I have connected a current transformer means with the input of the root mean square converter. Thus, when a current transformer means is connected with the input of the root mean square converter of the invention, a signal that is proportional to the current flowing through the primary winding is applied at the input and thereby an apparatus for electronically measuring alternating current is provided.

Further aspects of the invention will become apparent from the more detailed description of the invention. It will be understood that this specification concludes with a claim which particularly points out and distinctly claims the subject matter which I regard as my invention. The invention, however, both as to organization and method, together with further objects and advantages thereof, may be best understood by reference to the following description taken in conjunction with the accompanying drawings in which:

FIG. 1 is a schematic circuit diagram of the root mean square converter of one form of my invention;

FIG. 2 is a schematic circuit diagram of the biased diode function generator used in the embodiment of the invention illustrated in FIG. 1; and FIG. 3 is a schematic diagram of a current transformer which may be used in conjunction with the root mean square converter shown in FIG. 1 to provide a signal at the output thereof that is proportional to the root mean square value of the current monitored.

Referring now more particularly to the schematic circuit diagram of FIG. 1, the root means square converter of the invention is generally identified by reference numeral 10. A pair of input terminal leads 12, 13 serve as the input of the root mean square converter 10 and are provided for connection to an alternating voltage signal source (not shown) which is to be monitored by the root mean square converter.

It will be noted that input lead 12 is connected in circuit with an input resistor $R_1$ of an operational amplifier $A_1$. A feed back resistor $R_2$ is connected in the feedback path of the operational amplifier $A_1$. In an exemplification of the invention to be hereinafter more fully described, the resistive value of the feedback resistor $R_2$ was five times as great as the resistive value of the input resistor $R_1$ to provide the gain of five. However, input resistor $R_3$ and feedback resistor $R_4$ of operational amplifier $A_2$ have equal resistive values and provide unity gain for operational amplifier $A_2$.

Operational amplifier $A_1$ amplifies an alterning voltage signal applied at the input terminal leads 12, 13 and inverts this voltage signal. For example, when the negative half of an alternating voltage signal is applied at input terminal leads 12, 13, the signal at the output of amplifier $A_1$ is 180 degrees out of phase with the input signal. Hence, the positive half cycle is applied to the input of amplifier $A_2$ and to the input of the biased diode function generator $G_1$ by means of an electrical lead 14. This positive signal which now appears at the input of negatively biased diode function generator $G_1$ is proportional to the negative values of the alternating voltage signal applied at the input leads 12, 13.

The output of amplifier $A_2$ is connected with the biased diode function generator $G_2$ by means of an electrical lead 15. Operational amplifier $A_2$ performs a second inversion of the signal applied at input terminal leads 12, 13 so that the negative values of this signal appear as a negative signal at the input of biased diode function generator $G_2$. However, since diode function generator $G_2$ is negatively biased, the diode function generator $G_2$ will not pass this negative signal.

When the alternating signal applied at input leads 12, 13 swings positive, a positive signal proportional in magnitude thereto is supplied at the input of biased diode function generator $G_2$. Also, a negative signal proportional in magnitude to the positive value is supplied to the input of biased diode generator $G_1$. Since the diode function generators $G_1$ and $G_2$ are negatively biased, only diode function generator $G_2$ will allow the signal applied at its input to pass when the alternating signal at the input of the converter 10 is positive.

The positive signals applied at the inputs of the biased diode function generators $G_1$, $G_2$ are converted to signals at the output leads 16, 17 which are proportional to the square of the signals applied at the inputs thereof. For both positive and negative alternations of the alternating signal applied at the input of the converter 10, there is provided at the summing junction of operational amplifier $A_3$, to which output leads of biased diode function generators $G_1$, $G_2$ are joined, a unidirectional signal proportional to the square of the positive and negative values of the alternating signal applied at the input of the converter 10.

In schematic circuit diagram shown in FIG. 1, I have illustrated each of the biased diode function generators $G_1$, $G_2$ schematically by a single diode branch, the dashed lines indicating that a plurality of such branches are employed. It will be noted that biased diode function generator $G_1$ is represented schematically by the diode branch which includes a resistor $R_{20}$, a potentiometer $P_{20}$, a diode $D_{20}$ and an output lead 17. Similarly, biased diode function generator $G_2$ is represented schematically by the diode branch which includes a resistor $R_{10}$, a diode $D_{10}$ and output lead 16.

Referring now more particularly to FIG. 2, I have illustrated therein a more detailed schematic circuit diagram of the biased diode function generator $G_1$ used in the exemplification of the invention. The biased diode function generator $G_1$ includes ten resistors $R_{20}$, $R_{21}$, $R_{22}$, $R_{23}$, $R_{24}$, $R_{25}$, $R_{26}$, $R_{27}$, $R_{28}$, $R_{29}$, ten diodes $D_{20}$, $D_{21}$, $D_{22}$, $D_{23}$, $D_{24}$, $D_{25}$, $D_{26}$, $D_{27}$, $D_{28}$, $D_{29}$, ten potentiometers $P_{20}$, $P_{21}$, $P_{22}$, $P_{23}$, $P_{24}$, $P_{25}$, $P_{26}$, $P_{27}$, $P_{28}$, $P_{29}$, an input lead 14 and output lead 17. The potentiometers are adjusted so that the resistive value provided in each diode branch produces a different voltage for each diode so that as the voltage applied at the input of diode function generator $G_1$ increases from zero, the diodes successively conduct current to produce an output current at lead 17 that is proportional to the square of the positive voltage applied at lead 14. It will be noted that the anodes of the diodes are negatively biased since terminal lead 18 is connected to a negative bias source. Thus, only a signal of positive polarity that will render the anodes of the diodes more positive with respect to its cathode will cause the diodes to conduct. The point at which the individual diodes in the function generator $G_1$ begin to conduct is determined by the bias applied to the individual diode branches. The individual biases are set by the potentiometers so that the resultant current increases proportionally to the square of the input voltage applied at lead 14.

In the biased diode generators $G_1$, $G_2$ and $G_3$ used in the exemplification of the invention, ten diodes were used. It will be appreciated that this number of diodes employed can be readily varied. As more diodes are used, the biasing voltages can be closely trimmed so that the individual linear segments of the square function generated as the diodes successively conduct can be combined to achieve more accurate approximations.

Turning again to FIG. 1, it will be noted that the diodes $D_{10}$ and $D_{20}$ are so poled that positive currents are supplied to the input of operational amplifier $A_3$. Both biased diode function generators $G_1$, $G_2$ are connected to the electrical terminal lead 18 which is provided for connection to a suitable negative bias source (not shown). In the exemplification of the invention a 20 volt bias source was used.

The integrating circuit 30 is comprised of an operational amplifier $A_3$ having a feedback resistor $R_5$ and an integrating capacitor $C_1$. The purpose of the integrating circuit is to convert the current supplied by the bias diode function generators $G_1$, $G_2$ to a voltage signal at its output that is proportional to the average or mean value thereof. In other words, it performs the mathematical operation of integration upon the currents supplied to its summing junction. Preferably, it was found that the capacitive value of the capacitor $C_1$ should be equal to $3/f$, where the capacitance of $C_1$ is given in microfarads and $f$ is the lowest input frequency in cycles per second. For a 60 cycle input it was found that the capacitive value of $C_1$ should be approximately .05 microfarad. It will be understood that the larger the capacitive value of capacitor $C_1$, the slower is the response of the converter 10. For a capacitive value of .05 microfarad, it was found that the time response of the converter 10 was approximately 15 microseconds.

The output of the integrating circuit 30 is fed through input resistor $R_6$ to the input of a square root circuit means 31 which converts the signal applied at its input to a signal at output leads 20, 21 that is proportional to the square root of the signal applied at its input. The square root circuit means 31 is comprised of an operational amplifier $A_4$, a biased diode function generator $G_3$ and feedback resistors $R_7$, $R_8$. Since the biased diode function generator $G_3$ feeds back to the input of operational amplifier $A_4$ a current that is proportional to the square of the output voltage, the output voltage will be proportional to the square root of the input current. The resistors $R_7$ and variable resistor $R_8$ serve the purpose of permitting low point calibration of the square root circuit means 31 and provide a bypass path for amplifier $A_4$ for small values of the output voltage. It will be appreciated that the resistance of the biased diode function generator $G_3$ becomes almost infinite for extremely small values of the output voltage which might cause the amplifier gain to become extremely large resulting in drift at zero voltage output. Thus, resistors $R_7$ and $R_8$ provide a shunt path for very small values of the output voltage.

Referring now to FIG. 3, I have illustrated therein a schematic diagram of a current transformer network 22 which may be connected with the input terminal leads 12, 13 of the root mean square converter 10 to provide an electronic system for metering current. The current transformer network 22 includes a current transformer 23, a primary winding 24 inductively coupled with a secondary winding 25 on a magnetic core 26, a pair of input leads 26, 27 and output leads 28, 29. The input leads 26, 27 are provided for connection with the alternating current to be monitored. A non-inductive load resistor $R_9$ is connected across the secondary winding 25 and causes a voltage signal at output leads 28, 29 to be displaced 90 degrees so that it is in phase with the current flowing through the primary winding 24.

When a current transformer network 22, such as is shown in FIG. 3, is coupled to the input of the root mean square converter 10 shown in FIG. 1, the voltage signal across the input terminal leads 12, 13 will be proportional to the alternating current monitored and will be converted to a signal at output leads 20, 21 that is proportional to the root means square values thereof.

The operational amplifiers $A_1$, $A_2$, $A_3$, and $A_4$ used in the embodiment of the invention illustrated in FIG. 1 were chopper stabilized, high gain operational amplifiers. It will be understood that the voltage at the input of such operational amplifiers is maintained substantially at ground potential and that the voltage at the output can swing both positive and negative. Where an input resistor and a feedback resistor are employed, the output voltage of the amplifier will be equal to the input voltage multiplied by the ratio of the resistive value of the feedback resistor to the resistive value of the input resistor.

Operational amplifiers of the type which may be used in the practice of the invention are described at pages 34–39 of the text entitled "Analog Methods" by Walter J. Karplus and Walter W. Soroka, second edition, 1959, published by McGraw-Hill Book Co., Inc.

A root mean square converter employing essentially the following circuit components was constructed and reduced to practice.

| | |
|---|---|
| Resistors $R_1$, $R_3$, $R_4$ | 100,000 ohms. |
| Resistor $R_2$ | 500,000 ohms. |
| Operational amplifiers $A_1$, $A_2$, $A_3$, $A_4$ | Philbrick K2WJ with Philbrick type K2VJ chopper stabilizers. |
| Function generators $G_1$, $G_2$, $G_3$ | Pace $X^2$ fixed diode function generator, Model 16.022. |
| Capacitor $C_1$ | .047 microfarad. |
| Resistor $R_5$ | 300,000 ohms. |
| Resistor $R_6$ | 75,000 ohms. |
| Resistor $R_7$ | 1.2 megohms. |
| Variable resistor $R_8$ | 0–500,000 ohms. |

Function generators $G_1$, $G_2$, $G_3$ were biased from a 20 volt D.C. bias source (not shown) which was connected in circuit with terminal lead 18. A D.C. output signal of 20 volts was obtained at output leads 20, 21 when an alternating input signal of two volts R.M.S. was applied to input leads 12, 13 over a band of frequencies ranging from 20 cycles to two kilocycles. It was found that the root mean square converter employing the above described components had an accuracy of one half percent of full scale for readings ranging from 25 percent to 120 percent of full scale. The time response of the root mean square converter was approximately 15 milliseconds.

Turning now to the schematic circuit diagram of the FIG. 1, the operation of the root mean square converter 10 will be more fully described. When an alternating voltage signal is applied at input terminal leads 12, 13, this signal is inverted and amplified by operational amplifier $A_1$.

Taking an arbitrary instant when the alternating input signal at the input leads 12, 13 is of positive polarity, this signal is converted by operational amplifier $A_1$ to a negative signal at its output. This signal is applied at the input of operational amplifier $A_2$ and to the input of biased diode function generator $G_1$ by electrical lead 14. Biased diode function generator $G_1$ will not pass a negative signal. Also, this negative signal is inverted by operational amplifier $A_2$ and a positive signal is supplied to the biased diode function generator $G_2$. Function generator $G_2$ converts the signal applied at its input to a positive current that is proportional to the square of the positive value of the alternating signal applied at input leads 12, 13.

When the alternating signal applied at input leads 12, 13 swings negative, the voltage signal at the output of amplifier $A_1$ will be positive, and this positive signal will be applied to the input of biased diode function generator $G_1$. Biased diode function generator $G_1$ converts the negative values of the alternating signal applied at input leads 12, 13 to a positive current that is proportional to the square of the negative values. Because of the second inversion effected by operational amplifier $A_2$, negative values of the alternating input signal applied at input leads 12, 13 will appear as a negative signal at the output of amplifier $A_2$ but is blocked by the biased diode function generator $G_2$.

The magnitude of the positive output signals of biased diode function generators $G_1$, $G_2$ represent the values proportional to the square of both positive and negative values of the alternating input signal applied at input terminal leads 12, 13. These positive output signals are fed to the summing junction of operational amplifier $A_3$ and averaged by the integrator 30. The integrated signal is fed to the input of the square root current means 31 which converts this signal to a signal at output leads 20, 21 that is proportional to the square root of the integrated signal.

Since the root means square value of an alternating current or voltage is equal to the square root of the means of the squares of the instantaneous values thereof, the D.C. signal at output leads 20, 21 is proportional to the root means square of the alternating signal applied at the input leads 12, 13 of the root mean square converter 10.

By way of summary, it will be seen that the biased diode function generators $G_1$ and $G_2$ in conjunction with the operational amplifiers $A_1$ and $A_2$ convert the positive and negative values of the input signal to positive current signals proportional to the square of the positive and negative instantaneous values of the alternating signal applied at the input of the root mean square converter 10. The electrical signal representing the square of the instantaneous values is then converted by the integrating circuit 30 to a signal at its output which is proportional to the mean value of the squares of the instantaneous values of the alternating signal applied at the input of the root means square converter 10. The square root circuit means 31 converts the output signal of the integrating circuit 30 to a signal that is proportional to the square root of the signal applied at its input. In this manner the root mean square converter 10 shown schematically in FIG. 1 provides a D.C. or unidirectional output signal, the magnitude of which provides a measure of the root means square value of the alternating signal applied at its input.

From the foregoing description of the root mean square converter 10 and its operation, it will be apparent that in the root mean square converter 10 in accordance with the present invention the magnitude of the unidirectional or D.C. signal produced at its output provides a measure of the root mean square value of both positive and negative values. The root mean square converter of the invention is readily adaptable for use as a building block in analog and digital computers and can be used in conjunction with an X-Y recorder to provide a record of the root mean square values of the voltage or current of an alternating power supply monitored by the converter.

While the present invention has been described by reference to a preferred embodiment thereof, it is to be understood that many modifications may be made by those skilled in the art without actually departing from the invention. For example, it will be apparent that other types of squaring circuits, square root circuits and integrating circuits may be employed in the practice of the invention. It is, therefore, intended by the appended claim to cover all such modifications that fall within the spirit and scope of the invention.

What I claim as new and desire to secure by Letters Patent of the United States is:

In a root mean square converter for producing a direct current voltage proportional in magnitude to the root mean square value of an alternating signal applied at the input thereof, said converter comprising an integrating circuit having an input and an output for converting unidirectional signals applied to said input to a signal at said output proportional to the mean values of said applied input signals, the improvement comprising a first negatively biased diode function generator for producing a unidirectional signal at its output proportional to the square of the positive values of a signal applied to its input, a second negatively biased diode function generator for producing a unidirectional signal proportional to the square of the positive values of a signal applied to its input, circuit means for supplying an inverted signal proportional to said alternating signal to said first negatively biased diode function generator and for supplying a signal proportional to said alternating signal to said second negatively biased function generator, means coupling said first and second function generators to said said integrating circuit input, and a square root circuit means including an operational amplifier and a third negatively biased diode function generator for producing a signal proportional to the square of a signal applied at its input, said third function generator being connected in series circuit relation in the feedback path of said operational amplifier, said square root circuit means having its input coupled to the output of said integrating circuit for converting the output signal of said integrating circuit to a voltage proportional to the square root of the mean value of the squares of the instantaneous values of said alternating signal, the magnitude of said voltage being proportional to the root means square value of said alternating signal.

References Cited by the Examiner
UNITED STATES PATENTS

| | | | |
|---|---|---|---|
| 2,397,961 | 4/46 | Harris. | |
| 2,810,107 | 10/57 | Sauber | 324—132 |
| 2,842,740 | 7/58 | Sparks | 324—119 |
| 2,871,447 | 1/59 | Hall | 324—132 X |
| 3,031,143 | 4/62 | McCoy et al. | 235—194 |
| 3,054,951 | 9/62 | Richard | 324—132 X |

OTHER REFERENCES

Page 425, 1956—Korn and Korn, Electronic Analog Computers, New York, McGraw-Hill.

ROBERT C. BAILEY, *Primary Examiner.*

MALCOLM A. MORRISON, *Examiner.*